May 2, 1933.  A. HLAVA  1,906,595

RIVETING APPARATUS

Filed Jan. 18, 1930

ALOIS HLAVA
INVENTOR;
By Otto Kpunk
his Attorney

Patented May 2, 1933

1,906,595

UNITED STATES PATENT OFFICE

ALOIS HLAVA, OF PILSEN, CZECHOSLOVAKIA, ASSIGNOR TO LIMITED COMPANY FORMERLY SKODA WORKS, PILSEN, OF PRAGUE, CZECHOSLOVAKIA, A CORPORATION OF CZECHOSLOVAKIA

RIVETING APPARATUS

Application filed January 18, 1930, Serial No. 421,621, and in Czechoslovakia January 28, 1929.

The present invention relates to an adjustable head for pin riveting machines. In riveting apparatus it is very important to intercept the oscillations and side movements of the object to be riveted, which arise as a result of the pressure in the riveting machine, during the period in which the ends of the riveting pins are transformed into rivet heads, in order that these movements should not be transferred to the snap head die.

As the formation of the rivet head takes place exactly centrally, it is necessary to have a fixed but easily releasable periodic connection between the object to be riveted and the pressure head of the riveting machine during the riveting operation.

This connection is produced by means of centering pins which are fixed in the adjustable head in such a manner that they are pushed into the nearest rivet hole of the object to be riveted and thus this object is secured against any movement. These centering pins are especially useful in riveting boilers, where it is necessary to work the boiler seams on the boiler in three directions, namely, in the horizontal, vertical and oblique directions.

In the accompanying drawing an adjustable head according to the present invention is shown schematically.

Figure 1:
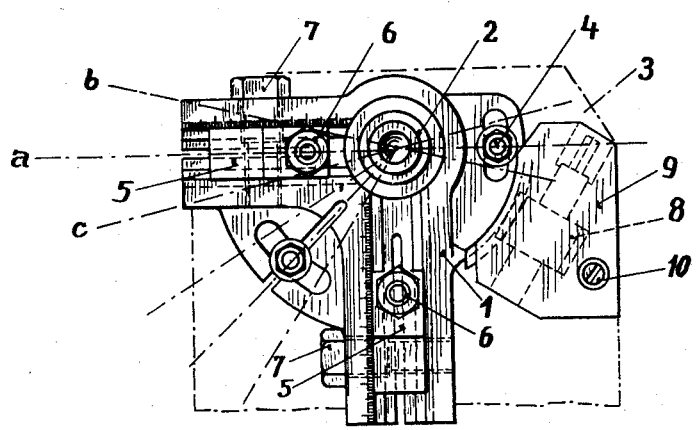

Fig. 1 is a plan view of the adjustable head with centering pins for horizontal and vertical riveting. By turning the head 1 about the axis of the snap head die the apparatus is prepared for oblique riveting.

Figure 2:
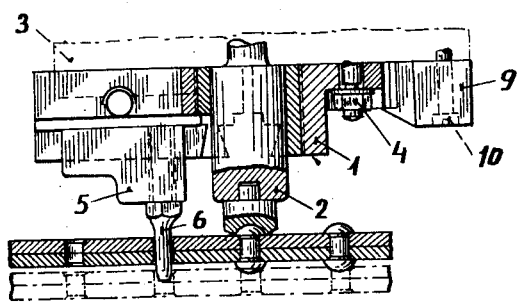

Fig. 2 is a sectional elevation through the adjustable head showing one centering pin for horizontal riveting. With the rivet head finished the centering pin is completely inserted in the rivet hole, as is also the case in vertical and oblique riveting. In Fig. 2, II shows (in dotted lines) the position of the pin and the snap head die before the insertion of the riveting pin and I the position of the pin and snap head die when the rivet head has been formed.

The adjustable head 1 is revolubly mounted on the snap head die holder 2 of the pressure head 3 of the riveting machine and is secured thereon by means of screws 4. On the adjustable head 1 are formed two arms at right angles to each other, which are provided with grooves for the blocks 5 for vertical and horizontal riveting, in which blocks the centering pins 6 are fixed in any known manner. These arms are provided with longitudinal graduations and the blocks with an adjusting mark so that the centering pins may be adjusted accurately in accordance with the riveting division. The securing of the blocks 5 in this position is accomplished by means of screws 7. By inserting the centering pin 6 which fits the riveting hole accurately, accurately central heads are obtained for the rivets.

The turning of the adjustable head for the riveting of oblique rivet seams takes place by means of a screw segment, with which a worm 8 engages, the latter being mounted in a mounting 9 which is fixed to the pressure head of the machine by means of screws 10. The worm shaft has a square portion on which a handle is fixed for turning the worm. The mounting of the worm is provided with an angle scale so that the adjustable head can be accurately adjusted by means of the worm for riveting oblique seams.

I claim:

1. Riveting apparatus comprising a pressure head, a snap head die, an adjustable head adapted to rotate about the axis of said snap head die and provided with a screw segment, a mounting attached to said pressure head, and a worm mounted on said mounting and engaging with said screw segment, the turning of said worm effecting the rotation of said adjustable head.

2. In a riveting machine, the combination of a pressure head carrying a die holder, an adjustable head secured to said pressure head and revoluble about the die holder as a centre, said pressure head including an arm extending at right angles to the axis of said die holder, and a centering pin carried by said arm and movable rectilinearly towards and away from said die holder.

3. In a riveting machine, the combination of a pressure head carrying a die holder, an adjustable head secured to said pressure head and revoluble about the die holder as a centre, said pressure head including a pair of arms at right angles to each other and to the axis of the die holder, and a centering pin carried by each arm and movable rectilinearly therein towards and away from said die holder.

4. In a riveting machine, the combination of a pressure head carrying a die holder, an adjustable head comprising a hub rotatable about said die holder and arms extending radially from said hub, means for securing the adjustable head to the pressure head, a block slidable in each arm towards and away from said die holder, and a centering pin carried by the block.

5. In a riveting machine, the combination of a pressure head carrying a die holder, an adjustable head comprising a hub rotatable about said die holders and arms extending radially from said hub at right angles to each other, means for securing the adjustable head to the pressure head, means for rotating the adjustable head about said die holder as a centre, a block slidable in each arm towards and away from said die holder, means for securing the blocks in adjusted position in the arms, and a centering pin carried by each block.

In testimony whereof I affix my signature.

ALOIS HLÁVA.